July 2, 1968  F. GROSSOEHME  3,391,330
DIRECT CURRENT POWER SUPPLIES WITH OVERLOAD PROTECTION
Filed Oct. 19, 1965

INVENTOR.
FLOYD GROSSOEHME
BY
ATTORNEY

United States Patent Office 3,391,330
Patented July 2, 1968

3,391,330
DIRECT CURRENT POWER SUPPLIES WITH OVERLOAD PROTECTION
Floyd Grossoehme, Cincinnati, Ohio, assignor to General Electric Company, a corporation of New York
Filed Oct. 19, 1965, Ser. No. 497,987
2 Claims. (Cl. 323—9)

ABSTRACT OF THE DISCLOSURE

A voltage regulator employs a compound connection of transistors to provide a variable resistance in obtaining accurate voltage regulation. In the event of excessive current loads, a diode circuit becomes conductive to cause the connection of transistors to have a marked increase in effective resistance irrespective of the loss in desired voltage regulation. An A.C. regulator is also effective in the event of an overload.

---

The present invention relates to improvements in direct current power supplies and more particularly to improved means for protecting such power supplies and components thereof from damage as a result of an overload condition.

The object of the invention is to prevent injury or destruction of a direct current power supply due to excessive current flow which is usually the result of an overload condition and in its most serious extreme is a direct short circuit across the power supply output.

An ancillary and more specific object of the invention is to provide an improved voltage regulator which gives an accurate voltage potential source so long as the current drawn therefrom, i.e. the load thereon, is below a given design value, which value, if exceeded, does not result in any damage to the components of the voltage regulator so that the voltage regulator is immediately able to function as such upon correction of the cause of the overload condition.

In one aspect the invention is characterized by a power supply comprising an alternating current source. Means are provided for regulating the effective voltage output of this alternating current source which is then rectified. This rectified output, preferably filtered, then provides the input for a direct current voltage regulator, the output of which is maintained at a substantially constant predetermined value.

Preferably this direct current voltage regulator comprises a variable resistance means and means for deriving an error signal indicative of a deviation of its output voltage from its predetermined value. Such error signals are employed to change the value of said variable resistance means to maintain the output voltage at the predetermined value.

Means responsive to output current flow exceeding a given limit are employed to increase the value of the variable resistance means and override any error signal to thereby minimize current flow in the event an excessive load is connected to the direct current output.

The means for regulating the effective voltage output of the alternating current source are referenced against the direct current output of the voltage regulator. This not only gives a more efficient mode of operation for providing a constant voltage source, but in the event of an overload condition when the effective resistance of the variable resistance means is increased in the voltage regulator, the output voltage then decreases and this in turn causes a reduction in the alternating current voltage output, further minimizing current flow in the event of an excessive load being placed on the power supply.

The above and other related objects and features of the invention will be apparent from a reading of the following description of the disclosure found in the accompanying drawing and the novelty thereof pointed out in the appended claims.

Figure 1:
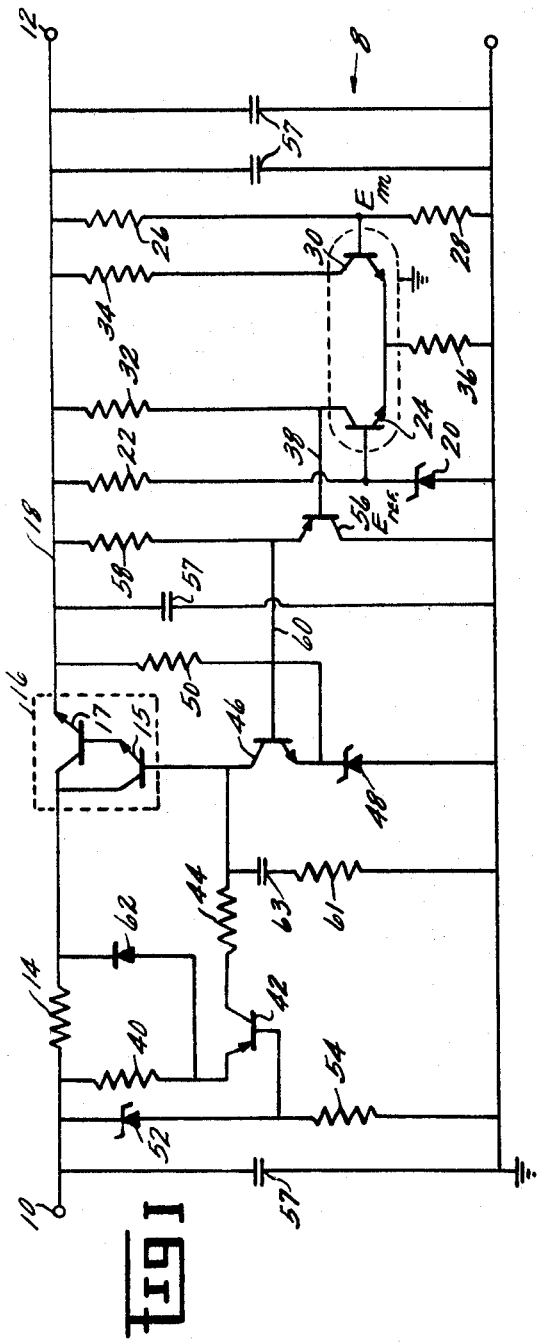
FIGURE 1 is a schematic view of a voltage regulator embodying the present invention.

Reference will first be made to FIGURE 1 for a description of a voltage regulator circuit 8 which is an essential component of the overall power supply seen in FIGURE 2 and later described in detail. The voltage regulator 8 comprises an input terminal 10 which is connected across ground to a positive D-C potential source (later described). One of the primary functions of the present circuit is to provide at an output terminal 12 a voltage of a given value which will be essentially constant regardless of variations in potential at the input 10 or variations (within limits) in the load imposed at the output terminal 12.

The input terminal 10 is connected to a resistor 14 which in turn is connected in series with a compound connection of transistors 16, the output from which is connected, by conductor 18, to the output terminal 12. The compound connection of transistors 16 functions in a known fashion as a variable resistor, and comprises a control transistor 15 and an output transistor 17. The voltage potential at the input terminal 10 is always maintained greater than the desired output voltage at the terminal 12. In normal operation the voltage drop across the resistor 14 and the drop across the compound connection of transistors 16 is such that the desired output voltage is provided at terminal 12.

This output voltage level is monitored by signal generating means. Thus a reference voltage of predetermined magnitude is provided by a Zener diode 20 connected in series with a resistor 22 from ground to the conductor 18. The voltage drop across the Zener diode 20 provides a reference voltage $E_{ref}$ at the base of a transistor 24. A measured or actual voltage indicator from the output terminal 12 is obtained by a voltage divider comprising resistors 26 and 28 with the measured voltage $E_m$ being derived therebetween and applied to the base of a transistor 30. The values of the resistors 26 and 28 are selected such that when the output voltage is at its desired potential, $E_m$ equals $E_{ref}$.

It will be seen that the transistors 24 and 30 are components of a differential amplifier with their collectors being connected through resistors 32 and 34 respectively to the positive conductor 18 and their emitters being connected to ground through a common resistor 36. A single output is derived from this amplifier by means of lead 38 connected to the collector of transistor 24. When $E_m$ equals $E_{ref}$ the potential on lead 38 is at a predetermined level. If the output voltage varies from its desired level, the potential on lead 38 will change either in a positive or a negative direction depending upon whether the output voltage is above or below the desired value. Such changes in the potential on lead 38 provide error signals which are employed in a manner described below to change the effective resistance of the compound connection of transistors 16.

Again assuming that the output voltage at terminal 12 is at its desired value, the means for establishing the effective resistance of the compound connection of transistors 16 will now be described. These means comprise a resistor 40 connected between the input terminal 10 and the emitter of a transistor 42. The collector of the transistor 42 is connected through a resistor 44 to the collector of a transistor 46 and also to the base of the control transistor 15 in the compound connection of transistors 16. The emitter of transistor 46 is connected to ground through a Zener diode 48. Quiescent current flow for the Zener diode 48 is provided by a resistor 50 connected therefrom to the conductor 18, thus establishing a fixed voltage level at the emitter of the transistor 46.

Referring back to the transistor 42, it will be noted that its base is maintained at a fixed bias level by a Zener diode 52 connected in series with a resistor 54 from the input terminal to ground. The relative values of the components are selected such that the transistor 42 is positively biased so that there will be current flow therethrough which may follow a path through resistor 44 and transistor 46 (also positively biased) back to ground. Current flow through this circuit, and particularly the potential developed by resistor 44 in the load circuit for the collector of transistor 46, establishes a preselected biasing value for the control transistor 15 which properly biases the compound connection of transistors 16 to maintain the desired voltage output at terminal 12 where $E_m$ equals $E_{ref}$.

Assuming next that an error signal is generated as a result of the potential at the output terminal 12 increasing above the desired value, the measured voltage $E_m$ will become more positive than the reference voltage $E_{ref}$. This will result in a positive going error signal on the lead 38 from the differential amplifier circuit. This error signal will be applied to the base of a transistor 56 which is connected in series with a resistor 58 from ground to the positive conductor 18.

The transistor 56 serves as a power amplifier and thus provides an amplified error signal on lead 60 which is connected from the emitter of transistor 56 to the base of the biasing transistor 46. The positive going error signal applied to the biasing transistor 46 increases the current flow through the collector load circuit thereof and particularly the biasing resistor 44 so that the voltage drop thereacross is increased and the biasing potential for the control transistor 15 is made more negative. This in turn has the effect of increasing the resistance of the compound connection of transistors, providing an increased voltage drop thereacross which reduces the output potential at terminal 12 to the desired predetermined level.

Correspondingly, if the output voltage at terminal 12 drops below the predetermined level, a negative going error signal will result in a decrease in the effective resistance of the compound connection of transistors 16 raising the output voltage to its desired level.

To complete the description of this circuit, further filtration of the D-C output is provided by condensers 57. Also, the resistor 61 and condensor 63 connected in series from collector of transistor 42 to ground are provided for frequency response shaping purposes.

The above describes normal operation of the voltage regulator circuit wherein the output load remains within design limits and the various components thereof are capable of dissipating whatever heat is generated as a result of normal current flow. This circuit further provides means for protecting the components thereof from injury when an overload condition occurs. Such an overload condition is illustrated in its extreme by a direct short circuit from the output terminal 12 to ground.

Reference is again made to resistor 14 which functions as a current detector and to resistor 40 which functions as a current reference resistor. It will be noted that the ends of these two resistors are connected by a diode 62 which has a fixed back bias derived from the arrangement of the Zener diode 52 and the emitter load circuit of what may be referred to as the overload transistor 42. So long as the current flow (indicative of load) through the resistor 14 is below a safe operating limit the voltage drop across this resistor is such that the diode 62 is back biased and there is no current flow therethrough. Under these conditions the overload transistor 42 remains positively biased and error signals control the effective resistance of the compound connection of transistors 16 as previously explained. However, when the voltage drop across the current detecting resistor 14 exceeds a given limit, the diode 62 becomes conductive and the voltage potential of resistor 14 is effectively connected to the emitter of the overload transistor 42. The values of the components are selected such that when the diode 62 is thus conductive, the overload transistor 42 is negatively biased and presents an extremely high resistance in the collector load circuit of the biasing transistor 46. The voltage drop across the biasing resistor 44 is sharply decreased, but the voltage drop across the collector, emitter of transistor 42 is greatly increased producing a steep increase in the negative biasing of the control transistor 15 which in turn sharply increases the effective resistance of the compound connection of transistors 16. This increase in the effective resistance of the compound connection of transistors 16 increases the voltage drop thereacross limiting current flow to a substantially constant value and dropping the output potential at terminal 12 below the predetermined value at which it is normally maintained for a safe working load. As this occurs, an error signal will be generated which will be applied to the base of the biasing transistor 46. However, having such an extremely high impedance in the collector load circuit of transistor 46 due to the negative biasing of transistor 42, the error signal will be overridden and have little or no effect on the biasing of the control transistor 15.

Figure 3:
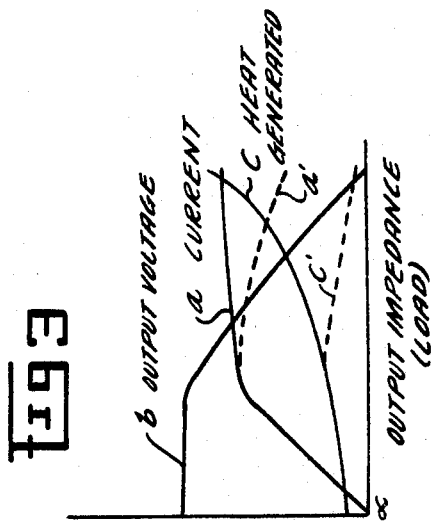
FIGURE 3 is a plot of voltage and current values referred to in describing the operation of the circuits found in FIGURES 1 and 2.

These effects are illustrated in FIGURE 3 wherein curve $a$ illustrates that current flow will increase progressively up to a given point at which time the overload transistor 42 becomes negatively biased and that thereafter there will be no substantial further increase in current flow as the output impedance is reduced to zero (a short circuit from terminal 12 to ground) representing an infinitely high load. Curve $b$ presents the output potential at terminal 12 illustrating that it is maintained at a predetermined constant level up to the point of an overload condition occurring and when the overload transistor 42 becomes negatively biased, the potential at the output terminal 12 reduces proportionately with a reduction in output impedance up to the occurrence of a short circuit.

The compound connection of transistors 16 may be selected so that under all operating conditions the current therethrough will not generate more heat than can be effectively dissipated without damage to the transistors thereof. Heat generation is illustrated by curve $c$ in FIGURE 3. With an infinite output impedance there will be some small amount of heat generated due to current flow internally of the voltage regulating circuit. As the load increases and current increases, the heat generated will also increase somewhat. After the overload condition occurs, the rate of heat generation increases at a greater rate but still does not exceed a tolerable limit since the current flow (curve $a$) is maintained substantially constant in the overload condition. Without the current limiting function a short circuit would cause the current flow to quickly increase to a point where the heat generated would destroy the transistors 15 and 17 as well as other components of the voltage regulating circuit.

Figure 2:
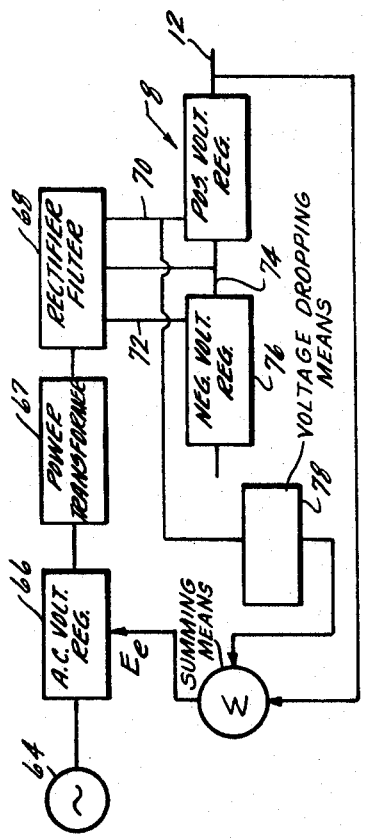
FIGURE 2 is a block diagram of a power supply in accordance with this invention and incorporating the voltage regulator seen in FIGURE 1.

FIGURE 2 illustrates a complete power supply in which the voltage regulator 8 is incorporated. This power supply comprises an alternator 64 providing an alternating current output which is fed to a voltage regulator element 66, advantageously of the phase controlled type, which provides a regulated A-C output that may be fed to a power transformer 67 and then to a conventional rectifier filter circuit 68, having outputs 70 and 72 which are respectively positive and negative with respect to a ground connection 74. The positive output 70 would be connected to the input terminal 10 of the voltage regulator 8 above described. The negative output 72 would be connected to the input terminal of a negative voltage regulator 76 which may be appropriately constructed with overload protection in essentially the same fashion as the positive voltage regulator 8, taking into account the difference in polarity.

Control of the alternating current voltage regulator element 66 is provided by summing (subtracting) the output of the positive voltage regulator 8, from terminal 12, with the positive output 70 from the rectifier filter 68 after it has been adjusted by voltage dropping means 78 to compensate for the normal voltage drop between the input terminal 10 and the output terminal 12. These summed signals provide an error signal $E_e$ for controlling operation of the alternating current voltage regulator.

The above described arrangement is highly effective in further maintaining the output voltage at terminal 12 at a desired value. This arrangement also provides the further advantage that when an overload condition occurs, the output of the alternating current voltage regulator will also be reduced so that there is a reduction in the input voltage applied to voltage regulator 8 and the heat generated during an overload condition can actually drop from that which occurs during normal operation. Thus reference is made to curve $a'$ illustrating a decrease in current flow and curve $c'$ illustrating a decrease in heat generated.

While the above description has been limited to the positive voltage regulator output, the same ends could be derived by employing the output of the negative voltage regulator as the reference for controlling operation of the alternating current voltage regulator 66. Alternately, the outputs of both the positive and negative voltage regulators could be used as the control reference for operation of the alternating current voltage regulator 66 so that its output would be reduced automatically in the event of an overload condition occurring in either the positive or negative outputs of the power supply.

Various modifications of the circuits herein disclosed will occur to those skilled in the art within the spirit and scope of the present invention which is therefore to be derived solely from the following claims.

Having thus described the invention, what is claimed as novel and desired to be secured by Letters Patent of the United States is:

1. A voltage regulator having
   an input connected to a voltage source which may vary in potential,
   an output from which an essentially constant voltage of predetermined value is to be supplied,
   a current detecting resistor connected in series with a compound connection of transistors from said input to said output,
   said compound connection of transistors comprising an output transistor operatively connected to a control transistor, said compound connection of transistors functioning as a variable resistance dependent upon the potential applied to the control transistor,
   a differential amplifier connected across the output of said voltage regulator and having as one input a constant reference voltage and as the other input a variable voltage dependent upon the potential at said output, the output of said differential amplifier having a predetermined value when the voltage regulator potential is at its predetermined value with deviations therefrom providing error signals of either polarity,
   a biasing transistor for said compound connection of transistors, said biasing transistor having a load circuit connected from said input through a current reference resistor, an overload transistor, and a biasing resistor, the voltage drop across the biasing resistor being connected to the control transistor of said compound connection of transistors to vary the effective resistance therefor as a function of the current flow through said biasing transistor,
   the output of said differential amplifier being operatively connected to said biasing transistor and responsive to error signals therefrom to increase or decrease the effective resistance of the compound connection of transistors dependent on the polarity of the error signal,
   a diode connected between said current detecting resistor and said current reference resistor, and
   means biasing said current reference resistor and the side of said diode connected thereto so that when the potential drop across said current detecting resistor exceeds a given value, current will flow through said diode, biasing the overload transistor to cut off, thereby substantially changing the potential at the control transistor to markedly increase the effective resistance of the connection of transistors irrespective of any error signal from said differential amplifier.

2. A voltage regulator as in claim 1 wherein the load circuit for the biasing transistor comprises a collector connection to the biasing resistor which in turn is connected to the collector of the overload transistor and the emitter of the overload transistor is connected to the current reference resistor, and further wherein
   the base of the overload transistor is connected to a Zener diode controlled potential source whereby the flow of current connected between the current detecting resistor and the current reference resistor is established by the Zener referenced potential of the base of the overload transistor.

References Cited

UNITED STATES PATENTS

| | | | |
|---|---|---|---|
| 2,452,611 | 11/1948 | Stratton. | |
| 2,708,734 | 5/1955 | Bruck. | |
| 2,724,040 | 11/1955 | Mouzon. | |
| 2,753,511 | 7/1956 | Buder. | |
| 3,040,235 | 6/1962 | Schemel et al. | |
| 3,076,130 | 1/1963 | Brunette et al. | 321—19 X |
| 3,201,680 | 8/1965 | Ross et al. | 323—9 |
| 3,289,069 | 11/1966 | Todd | 321—18 |
| 3,305,764 | 2/1967 | Todd | 323—9 |
| 3,309,599 | 3/1967 | Broomhall | 321—18 X |

LEE T. HIX, *Primary Examiner.*

A. D. PELLINEN, *Assistant Examiner.*